(12) United States Patent
Lim

(10) Patent No.: US 8,142,023 B2
(45) Date of Patent: Mar. 27, 2012

(54) OPTIMIZED PROJECTION PATTERN FOR LONG-RANGE DEPTH SENSING

(75) Inventor: Jongwoo Lim, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 646 days.

(21) Appl. No.: 12/337,391

(22) Filed: Dec. 17, 2008

(65) Prior Publication Data

US 2009/0161966 A1 Jun. 25, 2009

Related U.S. Application Data

(60) Provisional application No. 61/016,304, filed on Dec. 21, 2007.

(51) Int. Cl.
*G03B 21/26* (2006.01)

(52) U.S. Cl. .............. 353/28; 382/209; 703/2; 706/52

(58) Field of Classification Search .............. 353/28; 382/106, 209; 703/2; 706/52
See application file for complete search history.

(56) References Cited

U.S. PATENT DOCUMENTS

| | | | |
|---|---|---|---|
| 5,254,949 A | 10/1993 | McDonald et al. | |
| 6,633,244 B2 | 10/2003 | Avery et al. | |
| 6,754,370 B1 | 6/2004 | Hall-Holt et al. | |
| 6,813,035 B2 | 11/2004 | Hoffmann | |
| 7,149,544 B2 | 12/2006 | Kuehnel et al. | |
| 7,182,465 B2 | 2/2007 | Fuchs et al. | |
| 2004/0246473 A1 | 12/2004 | Hermary et al. | |
| 2005/0116952 A1 | 6/2005 | Je et al. | |
| 2007/0241863 A1* | 10/2007 | Udagawa et al. | 340/5.83 |

FOREIGN PATENT DOCUMENTS

WO WO2007059780 A1 5/2007

OTHER PUBLICATIONS

Horn, E., et al., "Toward optimal structured light patterns" First International Conference on Recent Advances in 3-D Digital Imaging and Modeling (3DIM '97), 1997, 26 Pages (Can be retrieved at http://citeseer.ist.psu.edu/cache/papers/cs/25771/http:zSzzSzwww.eng.tau.ac.ilzSz~nkzSzTRszSzeli.pdf/horn97toward.pdf).

(Continued)

*Primary Examiner* — Francis M Legasse, Jr.
(74) *Attorney, Agent, or Firm* — Fenwick & West LLP; Mark E. Duell

(57) ABSTRACT

A system and method are disclosed for generating an optimized projection pattern and for using the optimized projection pattern for depth reconstruction. The system includes a De Bruijn graph generation module, a non-recurring De Bruijn sequence generation module and projection pattern generation module. The De Bruijn graph generation module is configured to generate a classical De Bruijn graph. The non-recurring De Bruijn sequence generation module is configured to generate a non-recurring De Bruijn sequence by eliminating nodes with recurring alphabets from the classical De Bruijn sequence and calculating a Hamiltonian cycle of the modified De Bruijn graph. The projection pattern generation module is configured to generate the optimized projection pattern form the non-recurring De Bruijn sequence. The system further comprises a projector to project the non-recurring De Bruijn sequence to a plurality of images and a depth reconstruction module to reconstruct depth images from the plurality of the images.

35 Claims, 18 Drawing Sheets

OTHER PUBLICATIONS

Li, H., "Reconstruction using structured light" Universitat Karlsruhe (TH) Fakultat fur Informatik, Institut fur Betriebs- und Dialogsysteme, Prof. Dr. H. Prautzsch, Undergraduate Research Project, (Studienarbeit) Feb. 23, 2004, 64 Pages(Can be retrieved at http://i33www.ira.uka.de/~hao/Research/publications/rusl.pdf).

Pages, J., et al., "A new optimized De Bruijn coding strategy for structured light patterns" Proceedings of the 17th International Conference on Pattern Recognition (ICPR'04), 2004, 4 Pages (Can be retrieved at http://eia.udg.es/~jpages/research/papers/jpages_icpr2004.pdf).

Salvi, J., et al., "Pattern Codification strategies in structured light systems" Elsevier Science B.V., 2003, pp. 1-26 (Can be retrieved at http://www.vs.inf.ethz.ch/edu/SS2005/DS/papers/projected/salvi-coded-light.pdf).

Salvi, J., et al., "A robust-coded pattern projection for dynamic 3D scene measurement" Pattern Recognition Letters, 1998, pp. 1055-1065, vol. 19 (Can be retrieved at http://vicorob.udg.es/fitxers/articles/doc/182.pdf).

Zhang, L., et al., "Rapid shape acquisition using color structured light and multi-pass dynamic programming" First International Symposium on 3D Data Processing Visualization and Transmission (3DPVT'02), 2002, 13 Pages (Can be retrieved at http://grail.cs.washington.edu/pub/papers/Zhang-2002-RSA.pdf).

PCT International Search Report and Written Opinion, PCT/US2008/087768, Feb. 5, 2009, 11 Pages.

* cited by examiner $B(2, \{0,1\}) = 0011$ $B(3, \{0,1\}) = 00010111$ $B(2, \{0,1,2\}) = 001122021$

|a: |0|1|2|3|4|5|
|---|---|---|---|---|---|---|
|b: 0|0|0|0|0|0|0|
|1|1|2|3|4|5|6|
|2|2|4|6|1|3|5|
|3|3|6|2|5|1|4|
|4|4|1|5|2|6|3|
|5|5|3|1|6|4|2|
|6|6|5|4|3|2|1|

Figure 6A

OPTIMIZED PROJECTION PATTERN FOR LONG-RANGE DEPTH SENSING

CROSS-REFERENCE TO RELATED APPLICATION

This application claims priority from U.S. Patent Application No. 61/016,304, entitled "Optimized Projection Pattern for Long-Range Depth Sensing", filed on Dec. 21, 2007, which is hereby incorporated by reference in its entirety.

FIELD OF THE INVENTION

The present invention relates generally to depth reconstruction in computer vision, and in particular to generating optimized projection patterns using non-recurring De Bruijn sequences for depth reconstruction.

BACKGROUND OF THE INVENTION

Inferring depth from images or videos has been an important problem in computer vision research. Among a numerous approaches that have been proposed, triangulation based depth measurement is popular and well-understood. However, conventional stereo depth reconstruction algorithms based on triangulation have difficulty in finding correct correspondence in a pair of images when the scene is untextured or has repetitive patterns.

To help finding the correct correspondences between a pair of images, one can artificially create texture, for example, using additional varying illumination (often implemented as a light projector) as used in space-time stereo methods. Temporal illumination changes create a signature in an intensity profile at each pixel, and by matching the spatio-temporal block of neighboring pixels, some of the ambiguous correspondence between pixels of a pair of images can be resolved. However, space-time stereo methods still need to scan over epipolar lines to find correct correspondences at the expanse of increased computational overhead.

To reduce computational overhead in space-time stereo implementation, structured light methods replace one of the cameras used in space-time stereo implementation with a projector. By projecting certain light patterns, one can infer which ray from the projector reached the scene point corresponding to the pixels in the captured image, and depth can be reconstructed by means of triangulation. Specifically, in a camera-projector system for depth reconstruction, a coding method, such as Gray codes and Direct coding, encodes projected ray locations into projection patterns, where a projected ray needs to be uniquely identifiable There are three major challenges that conventional projection patterns for a structured light method may fail to work, especially in an indoor environment under natural illumination. The first challenge concerns a range aspect of depth reconstruction. A desired depth range in an indoor environment under natural illumination is much larger than traditional approaches (at least from 0.5 m to 5 m). As the distance to the surface in the scene to be reconstructed increases, the brightness of returned projection patterns is attenuated by the square of the distance.

The second challenge is related to illumination. To detect projection patterns under natural indoor illumination, the dynamic range and signal-to-noise ratio (SNR) of a camera used in a reconstruction system or the strength of projected light must be increased. In reality, there are certain practical and safety limitations in both approaches. For example, projected light must be safe to human eyes, which puts limits on the strength of the projected light to be used.

The last challenge concerns the scene to be reconstructed. Objects in a scene to be reconstructed may have various colors, textures and shapes, which make the strength of reflected light from projection vary greatly. These variations and challenges described above, e.g., depth range and illumination, make it difficult to encode projected ray locations into projection patterns using conventional coding algorithms. For example, Gray codes algorithm requires capturing many projection patterns, and it is not appropriate for dynamic scene reconstruction. Direct coding is insufficient when the intensity range of a captured pattern is small (due to distance or surface color) because Direct coding requires accurate measure of intensity variations.

Typical projection patterns for structured light methods are stripe-patterns and multi-slit patterns. Stripe patterns generally consist of parallel adjacent bands, and multi-slit patterns consist of narrow bands separated by black gaps. The objective of any coding strategy (that encodes the locations of projected rays into projection patterns) is that, given an element of the projection pattern, e.g., a stripe or a slit, its position in the pattern can be obtained by inspecting a local neighborhood of elements around it. Classical De Bruijn sequences are often used by a coding method to encode and decode locations of projected rays because a De Bruijn sequence can be used to represent the locations of projected rays.

Given a set of alphabets, $A=\{a_1, \ldots, a_k\}$ and a positive integer n, a classical De Bruijn sequence $B(n, A)$ is a cyclic sequence of the alphabets in which all possible length-n sequences of alphabets A appear exactly once (known as window property). FIG. 1A illustrates some examples of classical De Bruijn sequences. For example, given a set of alphabets, $A=\{0, 1\}$ and n=2, $B(2, \{0, 1\})$ is a De Bruijn sequence containing all length of 2 sequences of $\{0, 1\}$, i.e., 00, 01, 11, 10. The length of a De Bruijn sequence is $k^n$. Given a set of alphabets, $A=\{a_1, \ldots, a_k\}$ and a positive integer n, there exist many distinct De Bruijn sequences. For example, sequence 0011 is one of these De Bruijn sequences.

To generate classical De Bruijn sequences, a De Bruijn graph is normally used. To simplify description of an embodiment of the invention, a De Bruijn graph used to generate classical De Bruijn sequences is referred to as classical De Bruijn graph herein. By definition in graph theory, a De Bruijn graph $G_B(n, A)$ is a directed graph $\{V, E\}$, where V is a set of all possible lengthen permutations of A, $\{a_1 a_1 \ldots a_1, a_1 a_1 \ldots a_2, \ldots, a_k a_k \ldots a_k\}$, and E is the set of directed edges $\{(s_1 s_1 \ldots s_{n-1}, s_1 s_2 \ldots s_{n-1} s_m)\}$. A De Bruijn graph is Eulerian and Hamiltonian. The Euler cycles and Hamiltonian cycles of a De Bruijn graph are De Bruijn sequences. A Hamiltonian cycle of $G_B(n, A)$ or an Euler cycle of $G_B(n-1, A)$ generates a De Bruijn sequence $B(n, A)$.

FIG. 1B is a classical De Bruijn graph whose Hamiltonian cycles and Eulerian cycles generate classical De Bruijn sequences illustrated in FIG. 1A. Similarly, FIG. 1C is another classical De Bruijn graph whose Hamiltonian cycles generate classical De Bruijn sequences illustrated in FIG. 1A. For example, the first example sequence in FIG. 1A, $B(2, \{0, 1\})$=0011 is generated from a Hamiltonian cycle of FIG. 1B, and the second sequence, $B(3, \{0, 1\})$=00010111 is generated from an Eulerian cycle of the same graph (FIG. 1B). The third sequence, $B(2, \{0, 1, 2\})$=001122021 is generated from a Hamiltonian cycle of FIG. 1C.

A De Bruijn sequence has many consecutive identical or recurring alphabets, such as 00 or 111 in $B(2, \{0, 1\})$=0011 and $B(3, \{0, 1\})$=00010111. To encode projected ray locations into projection patterns using classical De Bruijn sequences, a conventional coding method, such as Direct coding, is impossible to distinguish such recurring alphabets in a captured image by a camera. For example, Direct coding uses shifted versions of a continuous periodic intensity pattern (e.g., a sine function) and measures the phase of the intensity pattern at each pixel from images being observed. As such, Direct coding requires accurate measurement of intensity variations. However, consecutive identical or recurring alphabets in classical De Bruijn sequences make Direct coding fail to work, especially in an indoor environment. To get around this problem, one may define alphabets as special patches, or place separators between alphabets in a classical De Bruijn sequence. However, both approaches (e.g., special patches and separators) result in sparse depth map reconstruction, and extra alphabets are often needed for the separators. For example, conventional XOR coding method uses alphabets as operands of XOR on each color channel, and detecting color changes in a captured image. This method may generate dense depth maps with multi-pass dynamic programming and shifted projection patterns over multiple frames. However the length-n subsequences in the resulting projection pattern from coding the alphabets are not unique anymore, thus, XOR coding method cannot be used for space-time stereo reconstruction methods. Also to detect one length-n subsequence, XOR coding method needs to observe n color changes, which needs n+1 stripes to be seen. Consequently, the efficiency of fast, reliable and dense depth reconstruction of images or videos is degraded. Optimized projection patterns for depth reconstruction are needed.

SUMMARY OF THE INVENTION

To provide fast, reliable and dense depth reconstruction, a depth reconstruction system exploits a novel concept of non-recurring De Bruijn sequences and generating optimized projection patterns based on them. For economical implementation of pattern projectors using lasers and diffractive optical elements, mirror symmetry is introduced to the non-recurring De Bruijn sequences. As a result, the depth reconstruction system overcomes many hard limitations in performance of cameras and projectors encountered by conventional depth reconstruction systems.

One embodiment of a disclosed system (and method) includes generating non-recurring De Bruijn sequences and encoding the non-recurring De Bruijn sequences into optimized projection patterns. The system includes a De Bruijn graph generation module, a non-recurring De Bruijn sequence generation module and projection pattern generation module. The De Bruijn graph generation module is configured to generate a classical De Bruijn graph. The non-recurring De Bruijn sequence generation module is configured to generate a non-recurring De Bruijn sequence by eliminating nodes with recurring alphabets from the classical De Bruijn sequence and calculating a Hamiltonian cycle of the modified De Bruijn graph. The projection pattern generation module is configured to generate the optimized projection pattern form the non-recurring De Bruijn sequence. The system further comprises a projector to project the non-recurring De Bruijn sequence to a plurality of images and a depth reconstruction module to reconstruct depth images from the plurality of the images.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 1A illustrates sample classical De Bruijn sequences.

FIG. 5A illustrates sample non-recurring De Bruijn sequences corresponding to the sample classical De Bruijn sequences of FIG. 1A according to one embodiment.

FIG. 6A and FIG. 6B illustrate a method to generate a symmetric non-recurring De Bruijn sequence according to one embodiment of the invention.

DETAILED DESCRIPTION OF THE INVENTION

Figure 1B:
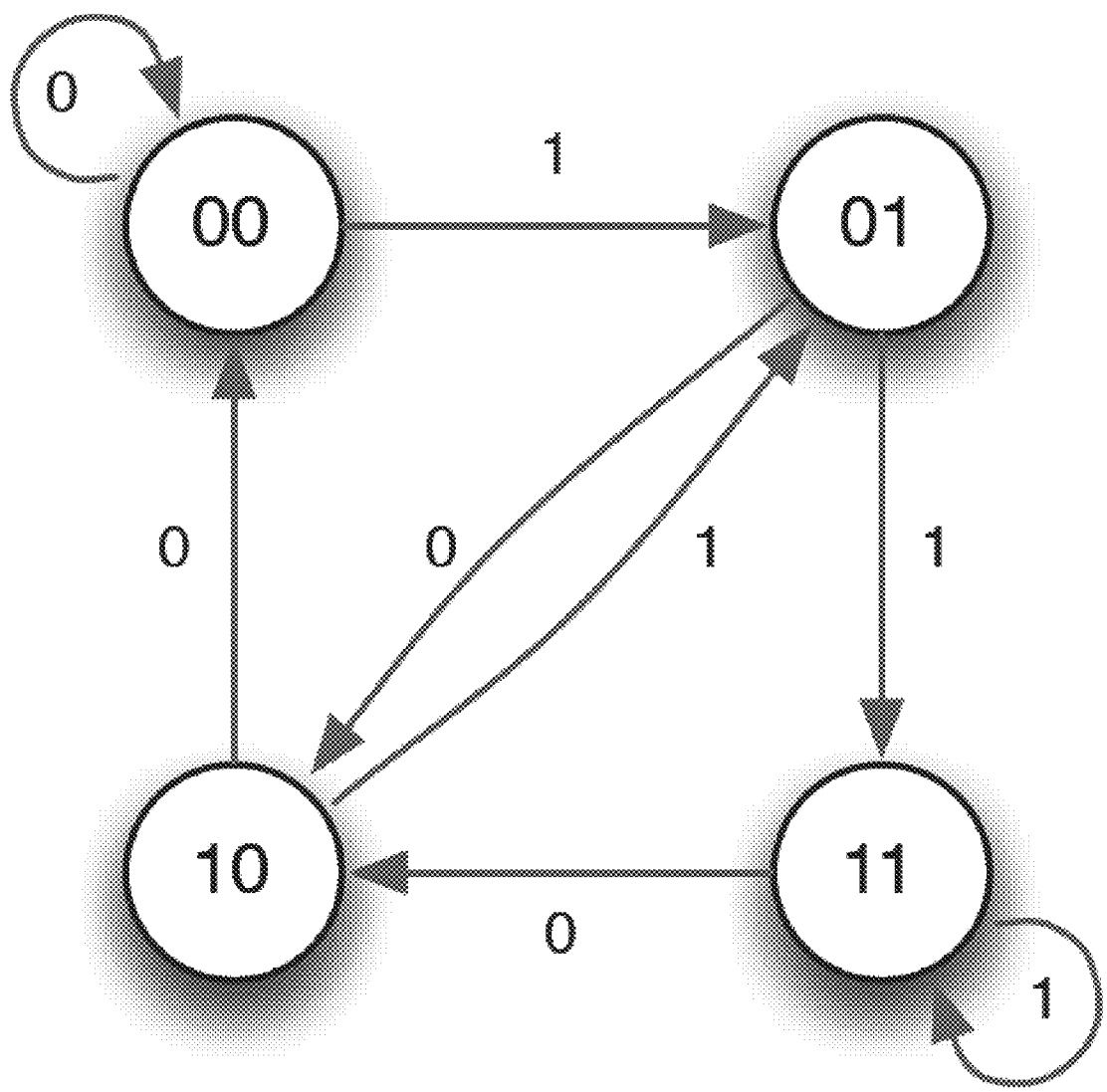
FIG. 1B is a classical De Bruijn graph corresponding to the first two sample De Bruijn sequences of FIG. 1A.
Figure 1C:
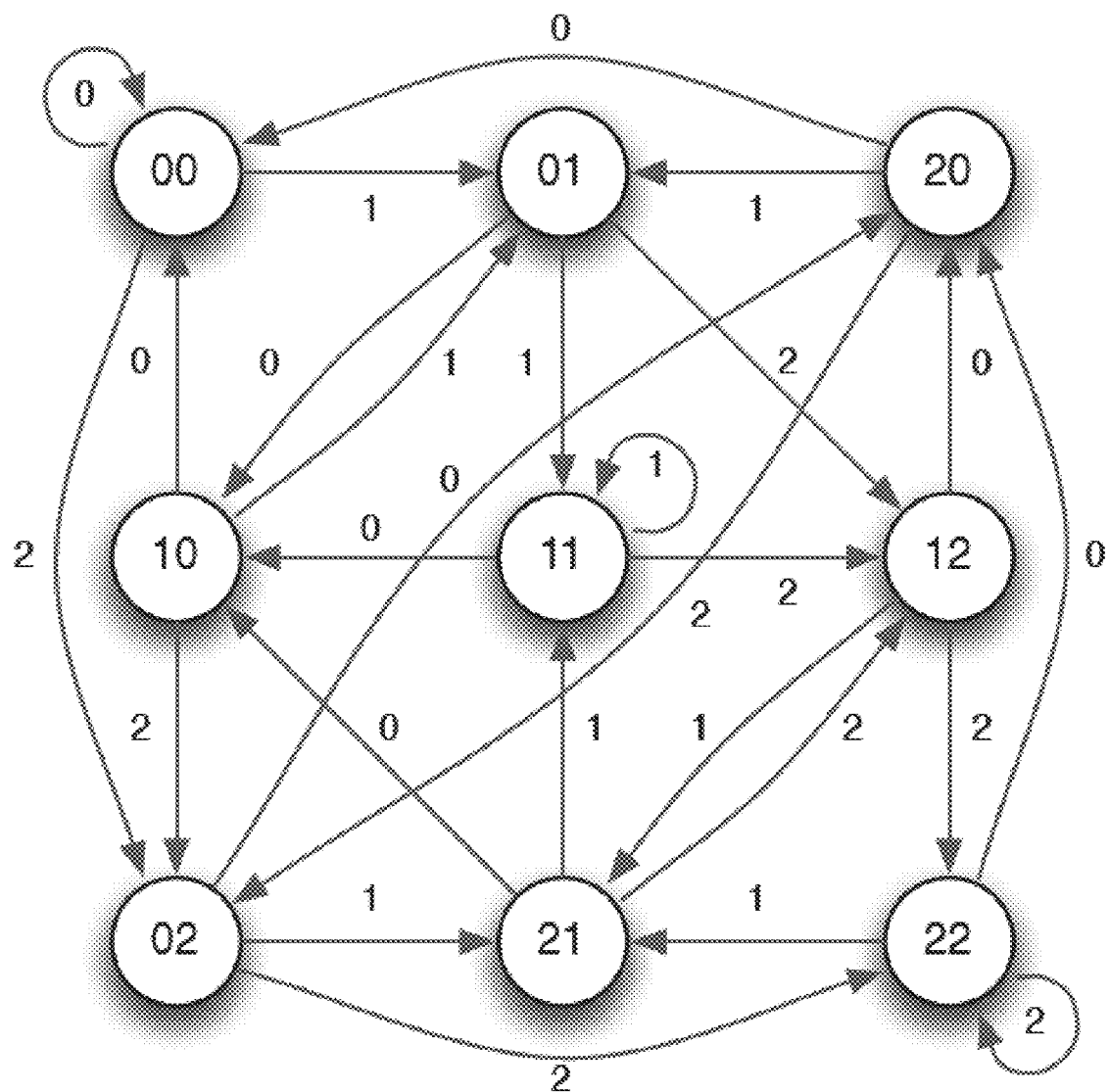
FIG. 1C is a classical De Bruijn graph corresponding to the last sample De Bruijn sequence of FIG. 1A.

An embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Figure 2A:
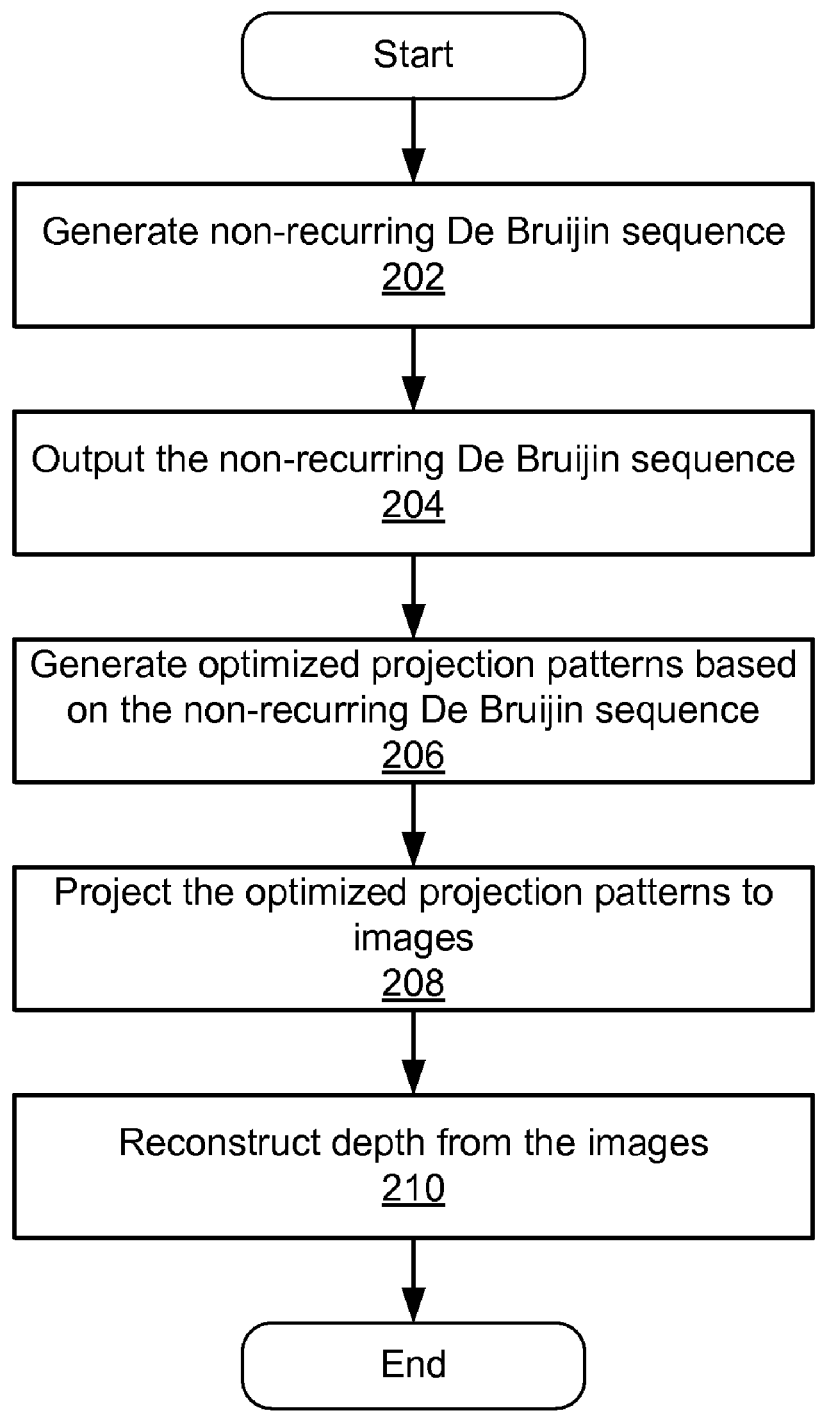
FIG. 2A is a flowchart of a depth reconstruction method using non-recurring De Bruijn sequences according to one embodiment of the invention.

FIG. 2A is a flowchart of a depth reconstruction method using non-recurring De Bruijn sequences according to one embodiment of the invention. Initially, a depth reconstruction system generates 202 one or more non-recurring De Bruijn sequences by a non-recurring De Bruijn sequence generation module 226. The depth reconstruction system outputs 204 the non-recurring De Bruijn sequence(s) to a computer-readable medium, such as DRAM in a data store 234, or directly to a projection pattern generation module 228 for further processing. The projection pattern generation module 228 receives the non-recurring De Bruijn sequence(s) and generates 206 optimized projection patterns based on the non-recurring De Bruijn sequence(s) by encoding the non-recurring De Bruijn sequences into projection patterns. A projector 230 of the depth reconstruction system projects 208 the optimized projection patterns to the images of a scene to be reconstructed. The depth reconstruction system reconstructs 210 the depth images by a depth reconstruction module 232 using an existing three-dimensional (3D) depth reconstruction algorithm, such as structured light. Further detail on the step of generating non-recurring De Bruijn sequences is presented in conjunction with the discussion of FIGS. 3, 4 and 5. Further detail on the step of generating optimized projection patterns based on the non-recurring De Bruijn sequence(s) is described in conjunction with the discussion of FIGS. 6, 7 and 8.

Figure 2B:
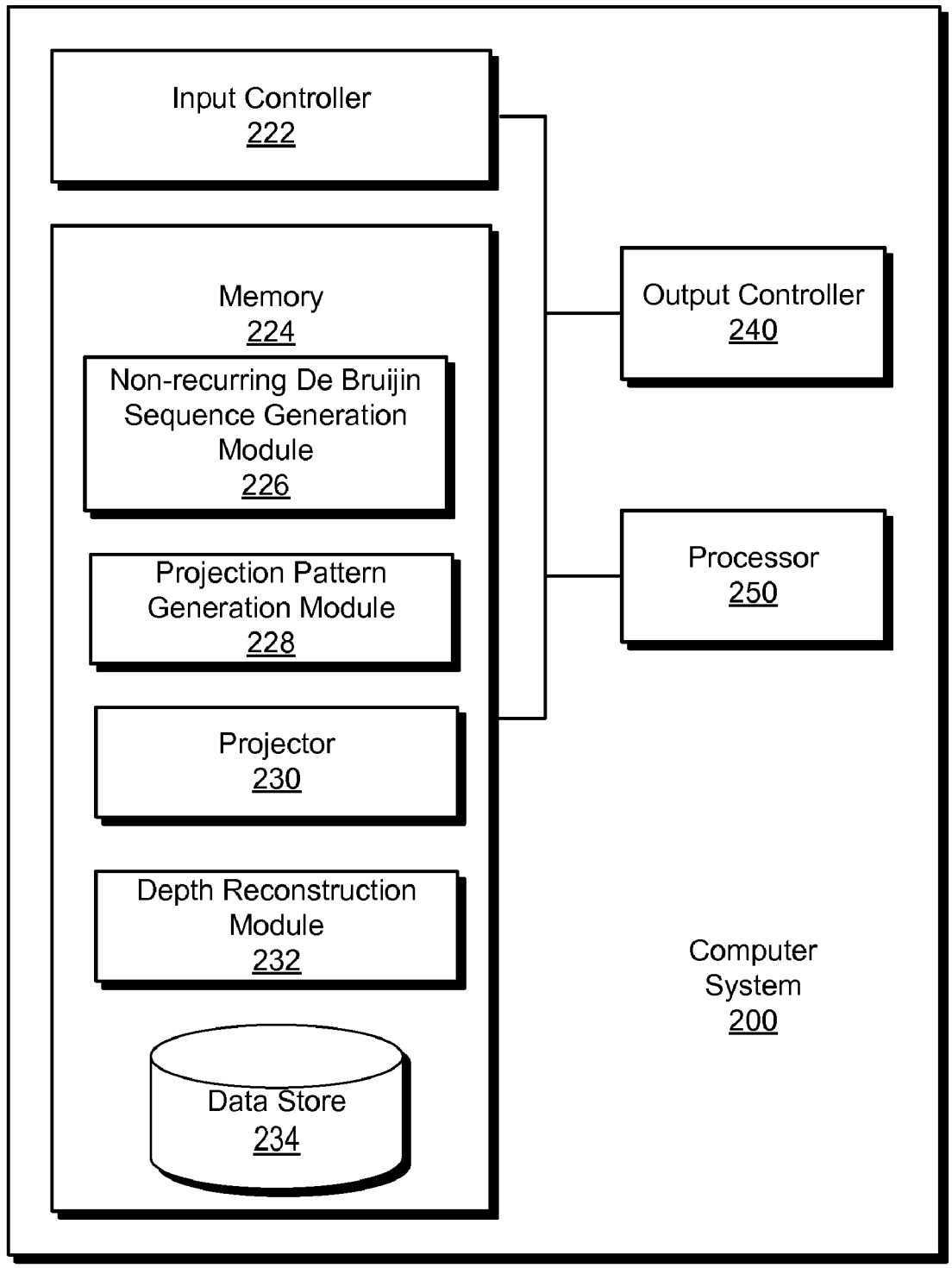
FIG. 2B is a computer system having computer modules for depth reconstruction using non-recurring De Bruijn sequences according to one embodiment of the invention.

FIG. 2B is a computer system having computer modules for depth reconstruction using non-recurring De Bruijn sequences according to one embodiment of the invention. The computer system 200 includes a processor 250, an input controller 222, an output controller 240 and a memory 224.

The memory 224 stores data and/or instructions that may be executed by the processor 250. The instructions may comprise code for performing any and/or all of the techniques described herein. Memory 224 may be a DRAM device, a static random access memory (SRAM), Flash RAM (non-volatile storage), combinations of the above, or some other memory device known in the art. The memory 224 comprises a non-recurring De Bruijn sequence generation module 226, a projection generation module 228, a projector 230, a depth reconstruction module 232 and a data store 234. The non-recurring De Bruijn sequence generation module 226 comprises computer executable instructions for carrying out the non-recurring De Bruijn sequence generation process described in FIGS. 3, 4 and 5. The projection pattern generation module 228 comprises computer executable instructions for carrying out the optimized projection patterns generation process described in FIGS. 6, 7 and 8. The projector 230 is used to project the optimized projection patterns to the image of a scene to be reconstructed. The depth reconstruction module 234 comprises computer executable instructions for reconstructing depth images. The data store 234 stores the non-recurring De Bruijn sequences in one embodiment of the invention.

Figure 3:
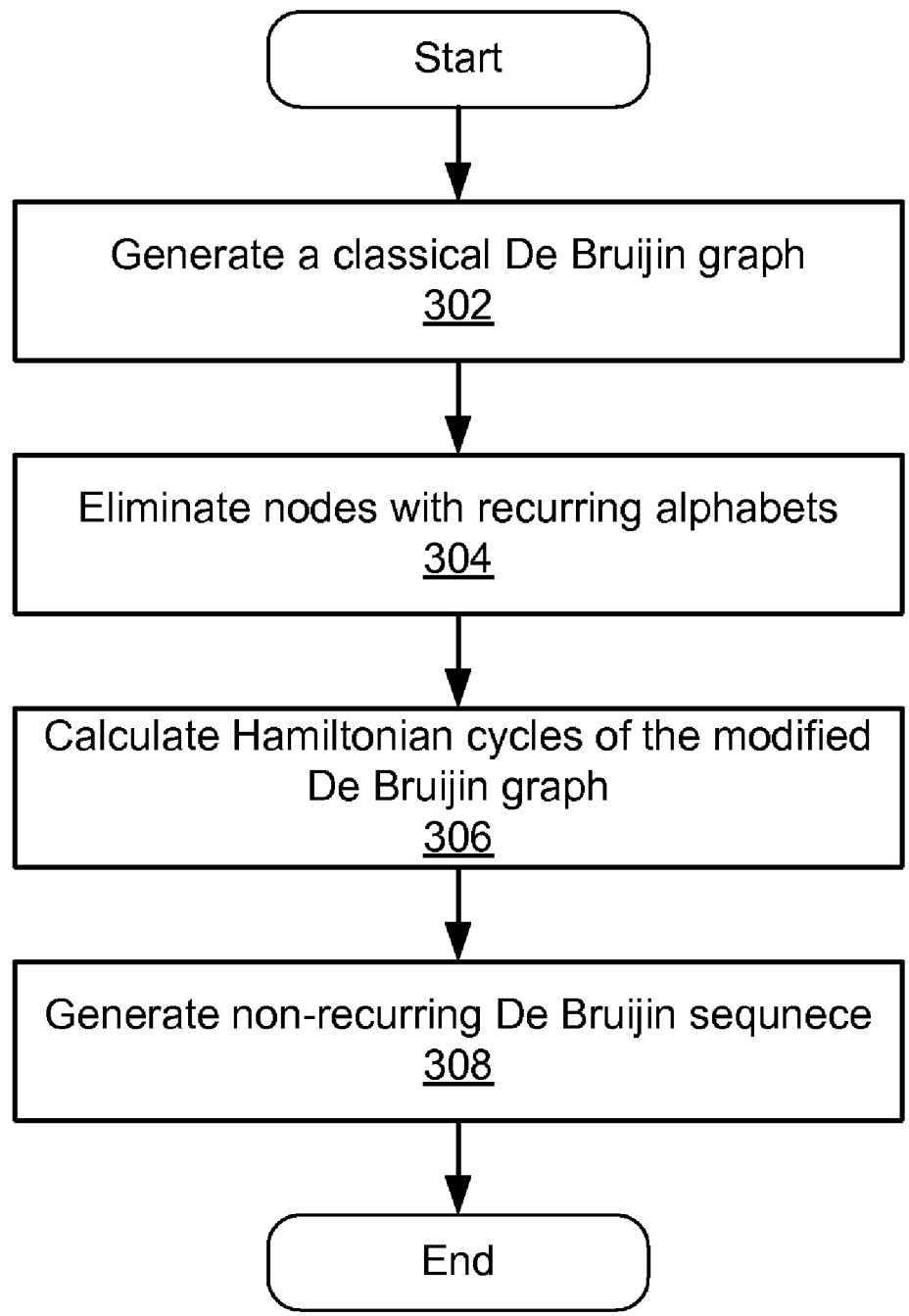
FIG. 3 is a flowchart of generating non-recurring De Bruijn sequence according to one embodiment of the invention.

FIG. 3 is a flowchart of generating non-recurring De Bruijn sequences according to one embodiment of the invention. Given a set of alphabets, $A=\{a_1, \ldots, a_k\}$ and a positive integer n, a non-recurring De Bruijn sequence $NB(n,A)$ is a cyclic sequence of the alphabets without any recurring alphabets, in which all possible length-n sequences of A, without any recurring alphabets, appear exactly once. Initially, a non-recurring De Bruijn sequence generation module of the depth reconstruction system generates 302 a classical De Bruijn graph with a plurality of nodes and edges. Each of the nodes in the classical De Bruijn graph is labeled by a sub-sequence of the alphabets. A classical De Bruijn sequence has many consecutive identical alphabets, i.e., the recurring alphabets. The non-recurring De Bruijn sequence generation module eliminates 304 the nodes having recurring alphabets from the classical De Bruijn graph.

In a classical De Bruijn graph $G_B(n,A)$, each node represents the length-n subsequences and a Hamiltonian cycle generates a cyclic sequence that contains all subsequences connected each other by sliding a subsequence window by one alphabet in the sequence. Let $G'_B(n,A)$ be a modified De Bruijn graph from a classical De Bruijn graph $G_B(n,A)$ by removing all nodes with recurring alphabets and corresponding edges, from the definition, Hamiltonian cycles of $G'_B(n,A)$, if they exist, are non-recurring De Bruijn sequences. The sequence generation module 226 calculates 306 Hamiltonian cycles of the modified De Bruijn graph. The sequence generation module 226 generates 308 the non-recurring De Bruijn sequences from the Hamiltonian cycles. The resulting non-recurring De Bruijn sequences can be used to generate projection patterns with better detectability compared with conventional projection patterns using classical De Bruijn sequences.

Figure 4:
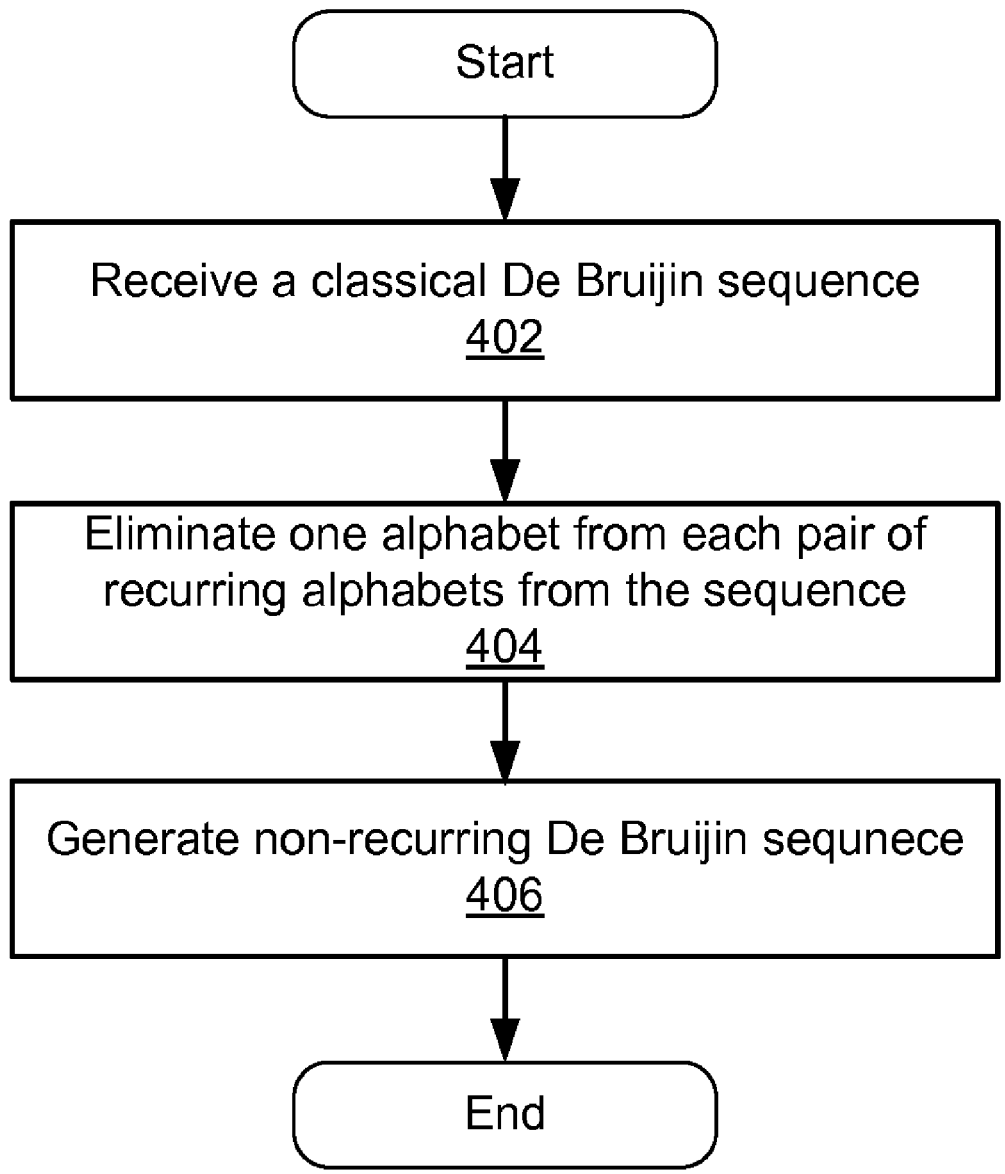
FIG. 4 is a flowchart of generating a length-two non-recurring De Bruijn sequence according to one embodiment of the invention.

FIG. 4 is a flowchart of generating a length-2 non-recurring De Bruijn sequence according to one embodiment of the invention. By the definition of non-recurring De Bruijn sequence described above, given a set of alphabets, such as $A=\{a_1, \ldots, a_k\}$ and a positive integer n, a non-recurring De Bruijn sequence is the longest sequence whose length-n sub-sequences are unique and directly detectable from observation. For a length-2 (i.e., n=2) classical De Bruijn sequence, there always exists length-2 non-recurring De Bruijn sequences. This is a because in a classical De Bruijn graph $G_B(2,A)$, the parents and children of a node with recurring alphabets always have direct links between them, since if a path xa→aa→ay exists, then an edge xa→ay always exists. Therefore, when the nodes with recurring alphabets are removed, Hamiltonian cycles passing through the nodes can "detour" along alternate edges connecting their parent and children. Thus, a length-2 non-recurring De Bruijn sequence can be generated by removing one alphabet in every recurring alphabets pairs of a classical De Bruijn sequence. The length of a length-2 non-recurring De Bruijn sequence NB(2,A) is k(k−1) where k=|A|.

As illustrated in FIG. 4, a non-recurring De Bruijn sequence generation module receives 402 a classical De Bruijn sequence and eliminates 404 one alphabet from each pair of recurring alphabets of the classical De Bruijn sequence. The resulting De Bruijn sequence 406 is a non-recurring De Bruijn sequence. For example, given a classical De Bruijn sequence B(2,{0, 1, 2})=001122021, the non-recurring sequence generation module 226 eliminates one alphabet for each pair of recurring alphabets. The resulting sequence becomes 012021 which is a length-2 non-recurring De Bruijn sequence NB(2,{0, 1, 2}). The length of the resulting non-recurring De Bruijn sequence NB(2,{0, 1, 2}) is 6.

Figure 5A:
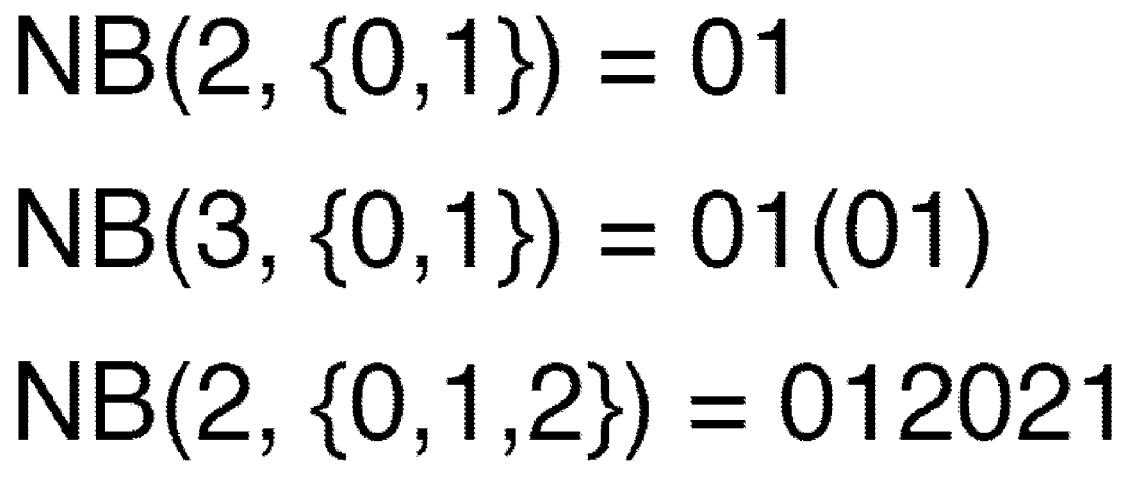

FIG. 5A illustrates sample non-recurring De Bruijn sequences corresponding to the sample classical De Bruijn sequences in FIG. 1A according to one embodiment. For example, for the classical De Bruijn sequence B(2,{0, 1})=0011 in FIG. 1A, the length-2 non-recurring De Bruijn sequence generation method presented in FIG. 4 can be applied to the B(2,{0,1})=0011. By eliminating a 0 from the first pair of recurring alphabets 00, and a 1 from the second pair of recurring alphabets 11, the resulting sequence, 01, is the non-recurring De Bruijn sequence NB(2,{0,1})=01. For another example, given the classical De Bruijn sequence B(2,{0,1,2})=001122021 in FIG. 1A, where a sub-sequence length is 2 and three alphabets, 0, 1, 2, are used, the length-2 non-recurring De Bruijn sequence NB(2,{0,1,2})=012021 is generated by eliminating one alphabet, 0, 1 or 2, from each pair of recurring alphabets in the classical De Bruijn sequence B(2,{0,1,2})=001122021.

For a non-recurring De Bruijn sequence with sub-sequences of length of 3, such as B(3,{0,1})=00010111, the generic non-recurring De Bruijn sequence generation method described in FIG. 3 can be applied. Specifically, for a given classical De Bruijn graph $G_B(3,A)$, the non-recurring De Bruijn sequence is generated by first removing all nodes with recurring alphabets in the $G_B(3,A)$, followed by calculating a Hamiltonian cycle from the modified De Bruijn graph $G'_B(3,A)$. The resulting sequence represented by the Hamiltonian cycle is a non-recurring De Bruijn sequence. For example, the classical De Bruijn sequence B(3,{0,1})=00010111 in FIG. 1A becomes NB(3,{0,1})=01(01), which contains all length-3 sub-sequences without consecutive recurring alphabets, i.e., 010, 101.

Figure 5B:
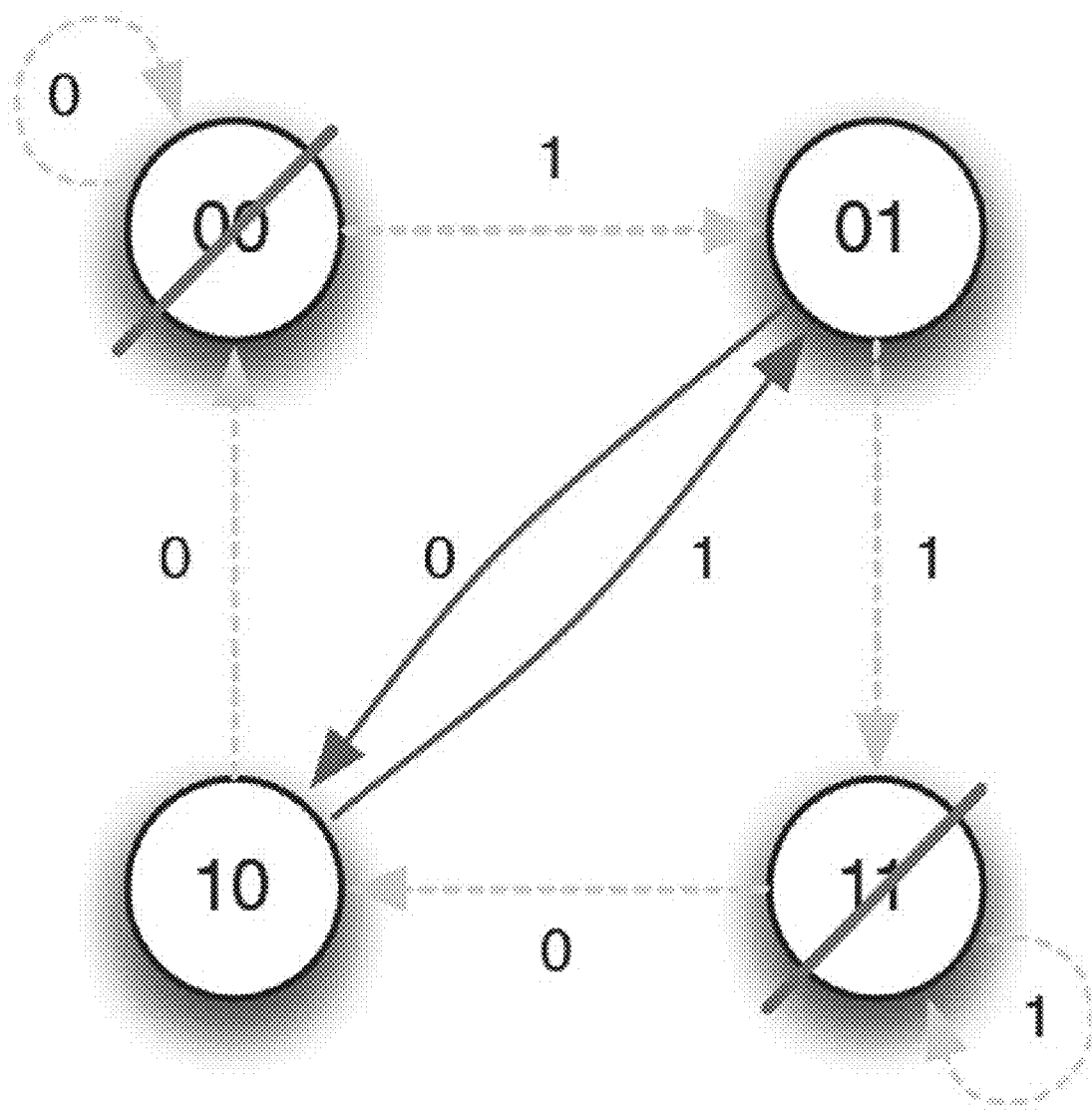
FIG. 5B is a modified De Bruijn graph corresponding to the first two sample non-recurring De Bruijn sequences of FIG. 5A according to one embodiment of the invention.
Figure 5C:
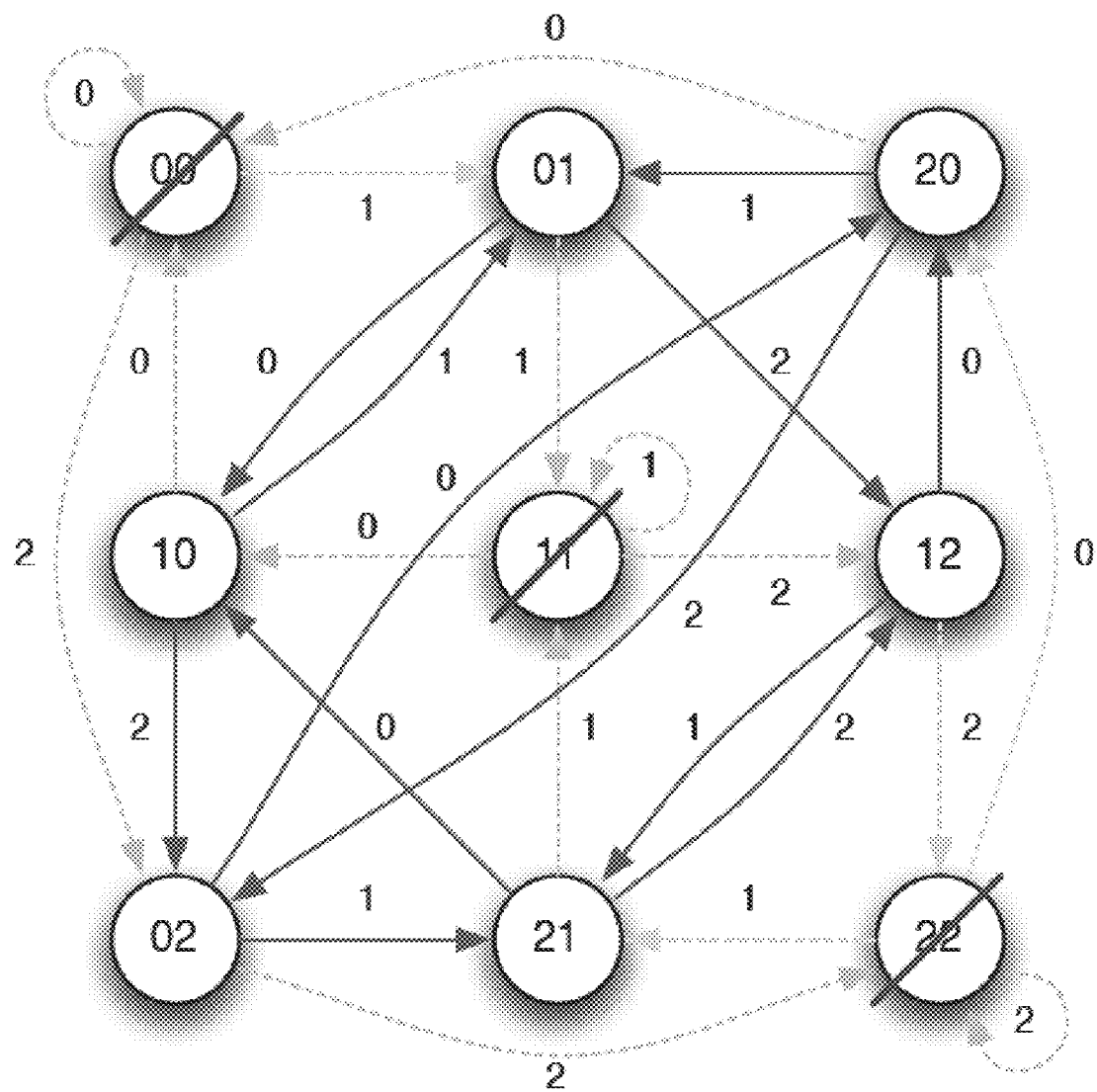
FIG. 5C is a modified De Bruijn graph corresponding to the last sample non-recurring De Bruijn sequence of FIG. 5A according to one embodiment of the invention.

FIG. 5B is a modified De Bruijn graph corresponding to the first two sample non-recurring De Bruijn sequences of FIG. 5A, e.g., NB(2,{0,1})=01 and NB(3,{0,1})=01(01) according to one embodiment. The nodes with consecutive recurring alphabets, e.g., 00 and 11, are removed by a non-recurring De Bruijn sequence generation module. All edges originating from the eliminated nodes (e.g., the dashed lines), are also eliminated from the classical De Bruijn graph illustrated in FIG. 1B. Similarly, FIG. 5C is a modified De Bruijn graph corresponding to the last sample non-recurring De Bruijn sequence of FIG. 5A, e.g., NB(2,{0,1,2})=012021 according to one embodiment of the invention.

Referring back to FIG. 2A, to generate 206 optimized projection patterns based on non-recurring De Bruijn sequences, the non-recurring De Bruijn sequences and their associated alphabets need to be encoded by a coding method with efficiency. Given the number of projected rays to be distinguished, the optimal coding scheme is the one with the minimum search window for identification of each ray. The search window can span spatial, spectral or temporal domains depending on which coding scheme is used.

Figure 7A:
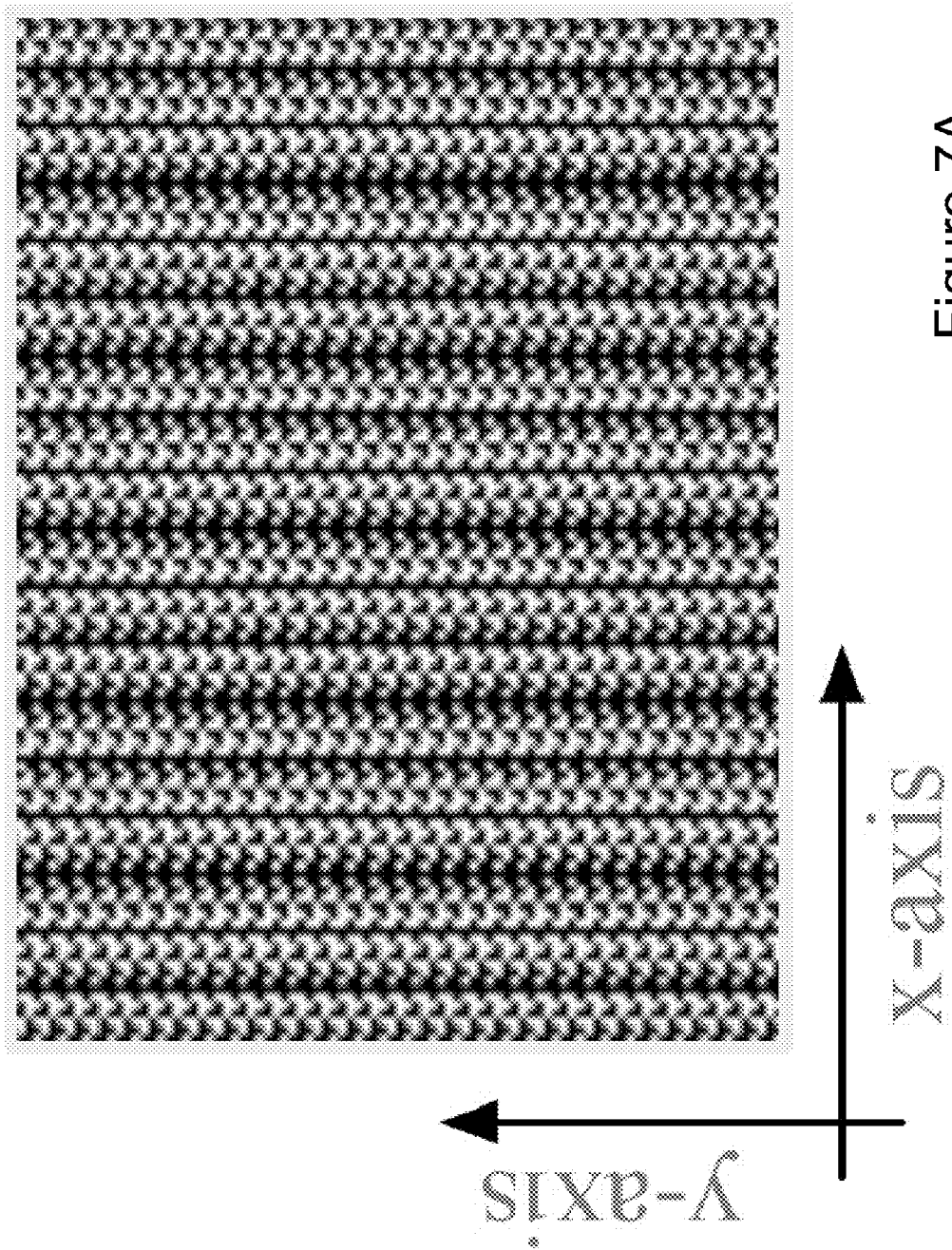
FIG. 7A illustrates a spatial domain method of encoding De Bruijn alphabets and sequences.
Figure 7B:
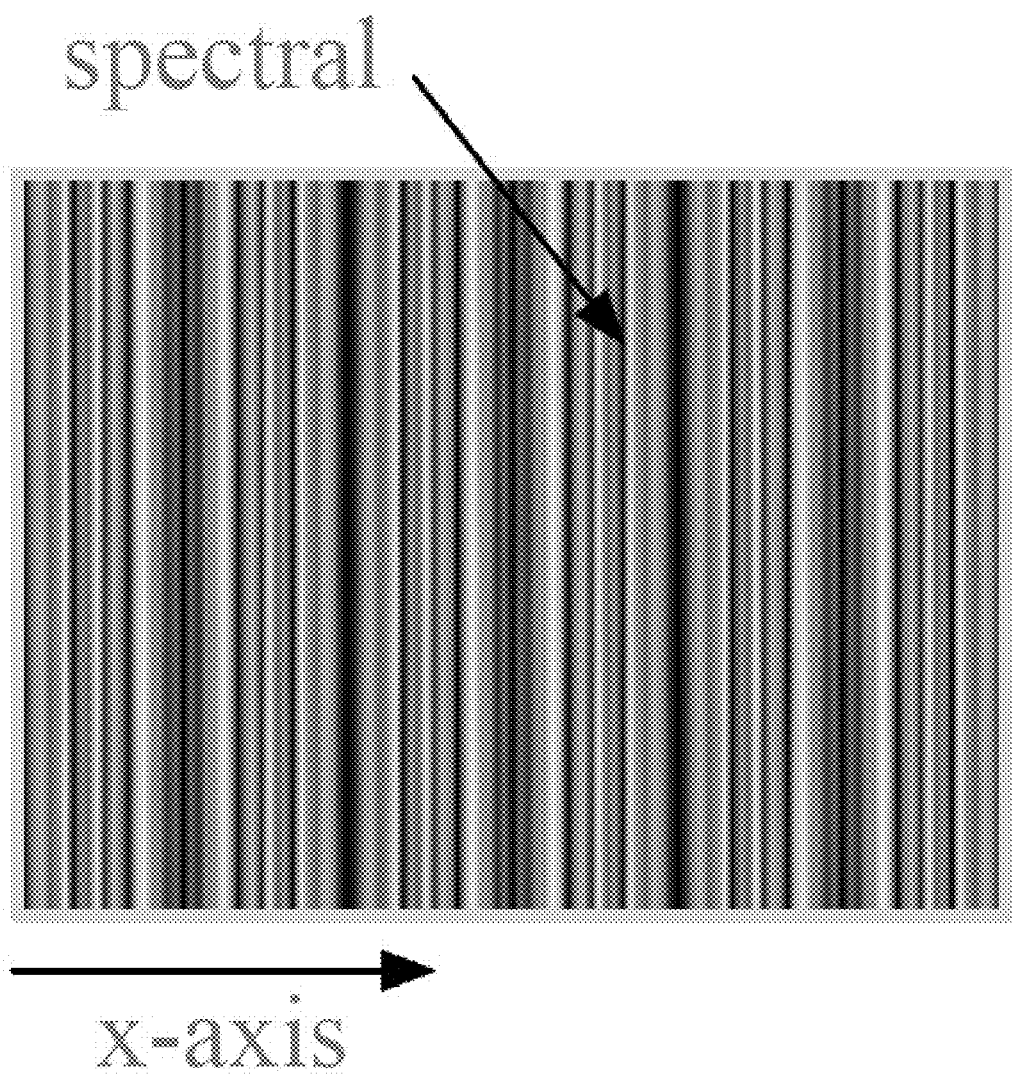
FIG. 7B illustrates a spectral domain method of encoding De Bruijn alphabets and sequences.
Figure 7C:
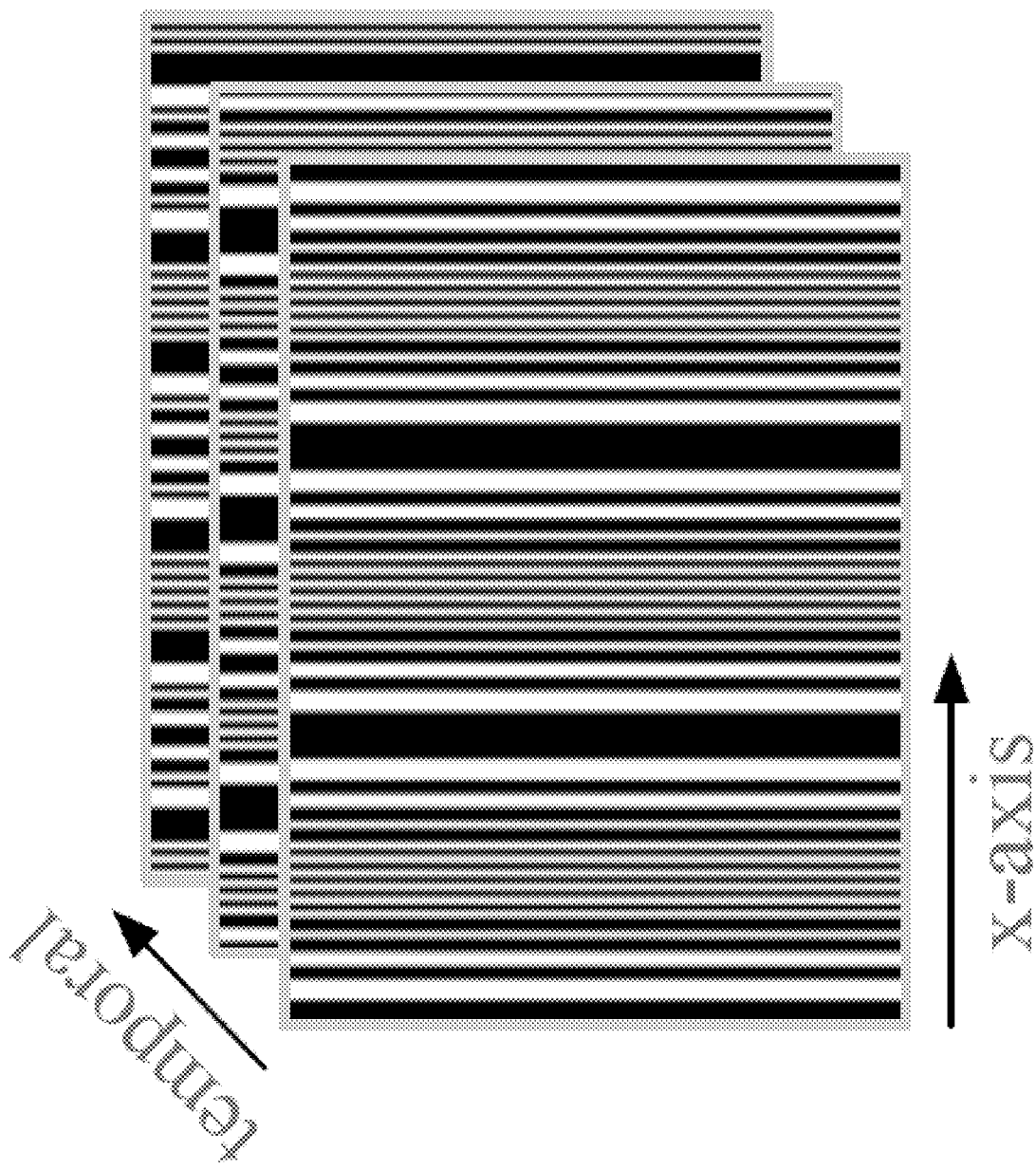
FIG. 7C illustrates a temporal domain method of encoding De Bruijn alphabets and sequences.

In a camera-projector system, there are multiple independent channels that can be used in encoding a classical De Bruijn sequence and its associated alphabets. For example, the spatial axes of an image to be reconstructed can be used as independent channels to encode a classical De Bruijn sequence. One of the spatial axes, e.g., x-axis, is used to encode the De Bruijn sequence itself, while two or three other channels, such as spatial y-axis, temporal or spectral, are available for alphabets encoding. For example, FIG. 7A illustrates an encoding of De Bruijn sequences and their alphabets in spatial domains (x- and y-axis). FIG. 7B illustrates an encoding of De Bruijn sequence and its associated alphabets in spectral domain where each pixel often has multiple chromatic channels (e.g., red, green or blue). FIG. 7C illustrates an encoding of De Bruijn sequences and their associated alphabets in a temporal domain where multiple image frames are captured continuously.

To achieve coding efficiency, in one embodiment, non-recurring De Bruijn sequences and their associated alphabets are encoded using temporal domain encoding method illustrated in FIG. 7C. Specifically, a projector of the depth reconstruction system projects each bit plane of the entire non-recurring De Bruijn sequence repeatedly over multiple continuous image frames. The search window spans temporal domain for alphabets encoding and spatial domain, e.g., x-axis, for sequence encoding. In another embodiment, either spectral or spatial y-axis may be used to encode the alphabets. Because non-recurring De Bruijn sequence guarantees all sub-sequences to be unique, thus, sliding window search fully utilizes the spatial resolution along x-axis.

In another embodiment, non-recurring De Bruijn sequences and their associated alphabets are encoded using spatial domains encoding method illustrated in FIG. 7A. Projecting a single pattern like the one in FIG. 7A can greatly improve the correspondence search in texture-less regions even for the standard stereo algorithms using sum-of-absolute-difference (SAD) or sum-of-squared-distance (SSD). Since the non-recurring De Bruijn sequence guarantees that there are no identical sub-windows within a search region, the standard stereo algorithms can find the correct match without modifications in the standard stereo algorithms.

Depending on which coding scheme is used, the penalty or cost for each coding scheme can be very different from each other. To quantitatively measure the cost or penalty of encoding a classical De Bruijn sequence and its associated alphabets, the penalty to encode a classical De Bruijn sequence is defined as, where is the search window size, and $p_s$ and $p_t$ are the penalty for special axis (x- or y-axis) and temporal axis, respectively. Given N rays to be processed, the Gray code coding requires bit-planes, and the penalty is. Similarly, the coding scheme (i.e., XOR coding) that uses alphabets as operands of XOR on each color channel and detects the color changes in a captured image has as its cost. The cost of encoding a non-recurring De Bruijn sequence using the temporal domain encoding has, which is least compared with Gray coding and XOR coding.

Encoding projected ray locations into projection patterns is complicated and economically expansive. To project a few fixed projection patterns onto an image to be reconstructed, an optical system may be using lasers with diffractive optical elements (DOE), which split laser beams into certain patterns. For economical implementation of a pattern projector using lasers and DOEs, symmetric non-recurring De Bruijn sequences are desirable. A symmetric non-recurring De Bruijn sequence SNB(n,A) is a non-recurring De Bruijn sequence whose first half $\{a_1, \ldots, a_{N/2}\}$ is same as reverse of the second half $\{a_{N/2}, \ldots, a_{N-1} a_0\}$, where N is the length of the sequence. In one embodiment, the following pseudo code generates a symmetric non-recurring De Bruijn sequence when n is 2 and k=|A| is a prime number larger than 2.

```
function seq = SNB2(k)
    for a=1 : k-1
        for b=0 : k-1
            seq+= mod(a×b,k)
    return seq
```

Figure 6B:
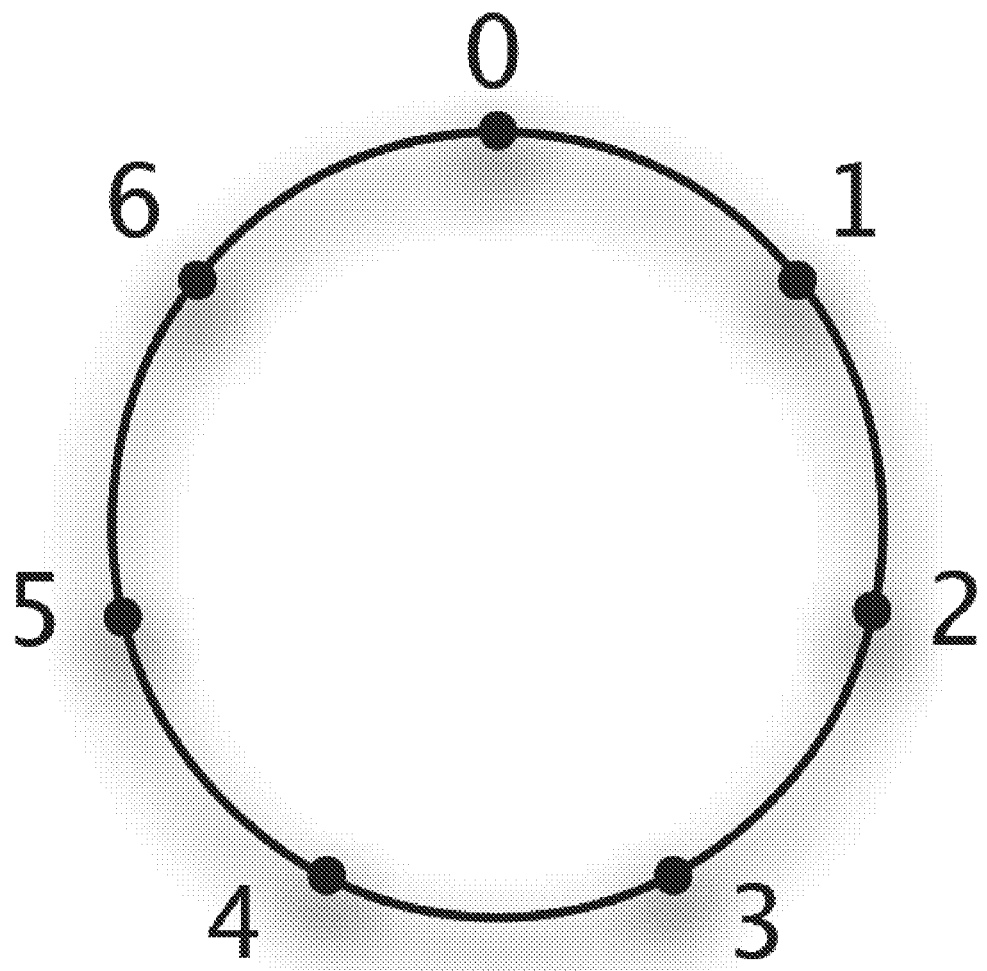

FIG. 6A and FIG. 6B illustrate a method to generate a symmetric non-recurring De Bruijn sequence, SNB(n, $\{0, \ldots, 6\}$), where n=2 and k=7, according to one embodiment of the invention. FIG. 6A comprises a 7×7 array. Values in the cells of the array in FIG. 6A represent the outputs from the execution of the pseudo code above. The columns of the array in FIG. 6A are arranged in an order corresponding to the indices (0, ..., 6) represented by FIG. 6B. FIG. 6B is a circle of indices (0, ..., 6) mapped by the mod(●,k) operator, which maps a non-negative integer to one of these indices. The subsequence generated by each inner loop execution, e.g., the second "for" loop in the pseudo code above, starts with 0, followed by the index whose distance on the circle to the previous output is a, and the next of the last index is 0 (i.e., mod). Since k is a prime number, each inner loop execution outputs all possible indices only once, and every index pair in the inner-loop output is a-apart on the circle. As a is increased from 1 to k−1, every length-2 subsequences xy in the entire output sequence is a unique pair of starting index x and distance on circle $a_{xy}$=mod(y−x,k), which means there is no other occurrence of xy in the sequence.

Figure 8:
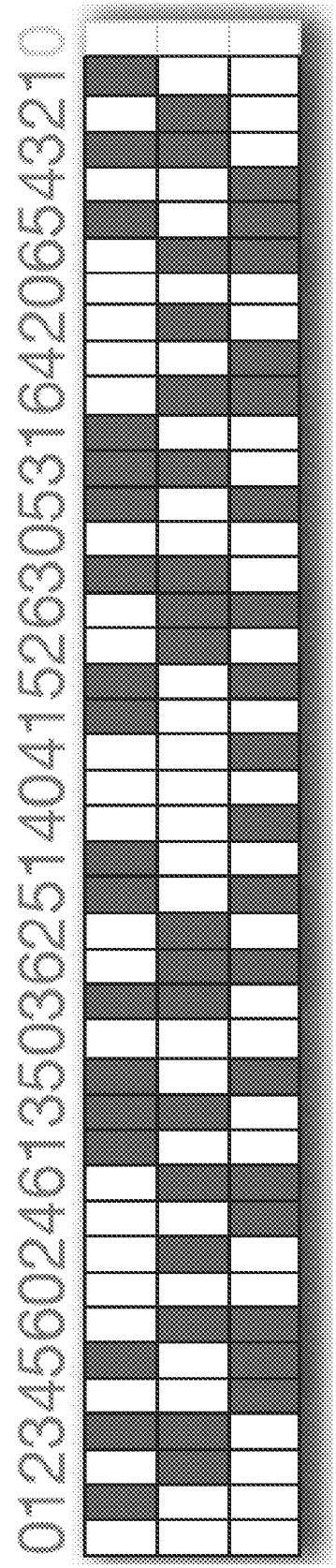
FIG. 8 illustrates bit plan encoding of the symmetric non-recurring De Bruijn sequence illustrated in FIG. 6 according to one embodiment.

FIG. 8 illustrates bit plane encoding of the symmetric non-recurring De Bruijn sequence illustrated in FIG. 6 according to one embodiment. It is noted that $\{0, \ldots, 6\}$ is the maximal set of alphabets for three bit planes, since 0(000) and 7(111) cannot be distinguished from observation. FIG. 8 comprises a 43×3 array, which is the bit plane encoding of the symmetric non-recurring De Bruijn sequence illustrated in FIG. 6A. The numbers on top of the array in FIG. 8 are the 6 columns of FIG. 6A re-arranged in serial order starting from column 0 to column 6. For example, the first 7 numbers $\{0,1,2,3,4,5,6\}$, corresponds to the first column of FIG. 6A. Similarly, a second group of numbers, $\{0,2,4,6,1,3,5\}$, corresponds to the second column of FIG. 6A. It is noted that last number, 0, of the numbers on top of the 43×3 array in FIG. 8 corresponds to the next of the last index (i.e., mod), represented by FIG. 6B.

The three rows of the 43×3 array in FIG. 8 correspond to the three bit planes of the symmetric non-recurring De Bruijn sequence illustrated in FIG. 6A. Each column of the 43×3 array in FIG. 8 is a 3-bit sequence, whose value is equal to the value of the number associated with the column. A light shaded rectangle in the 43×3 array in FIG. 8 represents binary "0" and dark shaded rectangle is for binary "1". For example, first column of three lighted shaded rectangles represents "0", which is the value of the number, "0", on top of the first column. For another example, the second column consists of two lighted shaded rectangle and one dark shaded rectangle, representing 1 (i.e., 001), which is the value of the number of the second column.

In general, the process of detecting and decoding observed projected patterns is coupled with the corresponding encoding process. To determine ray location for all pixels along each horizontal scanline, the neighboring pixels need to be considered, and a Hidden Markov Model (HMM) can be used to model the relationship between those pixels probabilistically. The Hamiltonian cycle in a modified De Bruijn graph to generate its corresponding non-recurring De Bruijn sequence may be used as a basis of the decoding by HMM model, with one additional 'null' state (node) to handle occluded or non-lit areas by a projector. A transition between the nodes in a modified De Bruijn graph is represented by a directed edge between the nodes, and these directed edges need to be detected for decoding. To make the detection more reliable, each alphabet occupies a few pixels wide in the captured image, thus the 'self' edges that make no state change are helpful for successful decoding. If there is depth discontinuity in the scene to be reconstructed, there may be unlit region in the scene observed by the camera. The 'null' state captures this situation, so transition between regular nodes and the null node (in both directions) should to be included in the HMM model. Depth discontinuity may also cause transition over multiple edges, thus regular nodes need to be connected each other too.

Figure 9A:
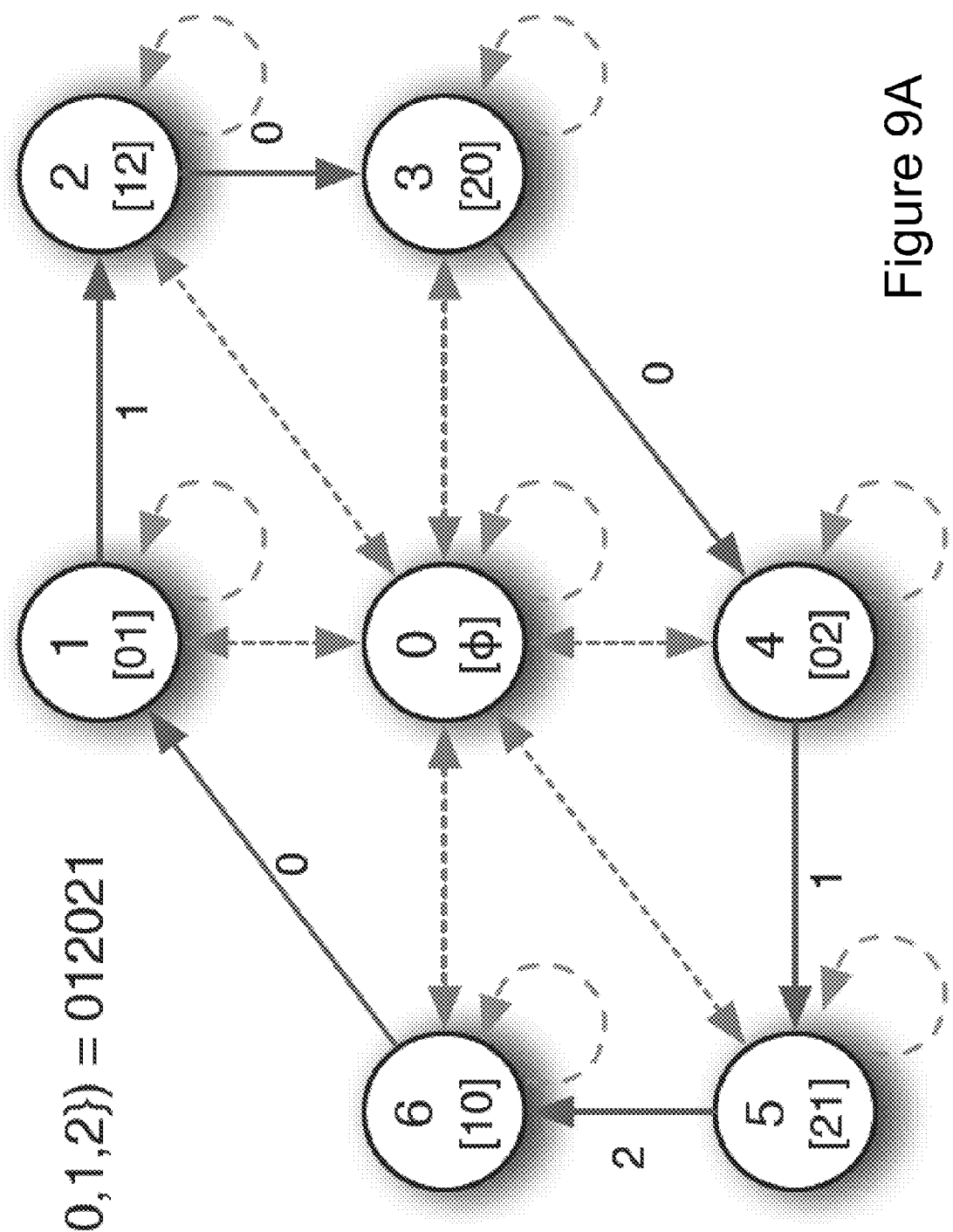
FIG. 9A illustrates a method of decoding projected patterns based on non-recurring De Bruijn sequences using a Hidden Markov Model (HMM) according to one embodiment of the invention.

FIG. 9A illustrates a method of decoding projected patterns based on non-recurring De Bruijn sequences using a HMM model for structured light applications according to one embodiment of the invention. FIG. 9A illustrates a HMM for a non-recurring De Bruijn sequence NB(2,{0,1,2})=012021, illustrated by FIG. 5C. Unlike FIG. 5C, FIG. 9A includes an extra "null" node, i.e., 0 ([Φ]), in the center of the graph, in addition to 6 regular nodes (e.g., 1, 2, 3, 4, 5, and 6). There are four types of directed edges in FIG. 9A representing different types of transitions. Transition between regular nodes is represented by a directed edge in solid line, and such transition constitutes a legitimate transition to be detected for decoding. A "self" edge in dashed circle for each regular node indicates no-state change, i.e., no transition, to handle white stripes in the projected patterns. The edges between a regular node and the "null" node are in dotted lines, and these edges are useful for indicating depth discontinuity or image noise in a scene. The fourth type of edge (not shown in FIG. 9A) is an edge between a pair of regular nodes and such an edge needs not to be detected for decoding.

Figure 9B:
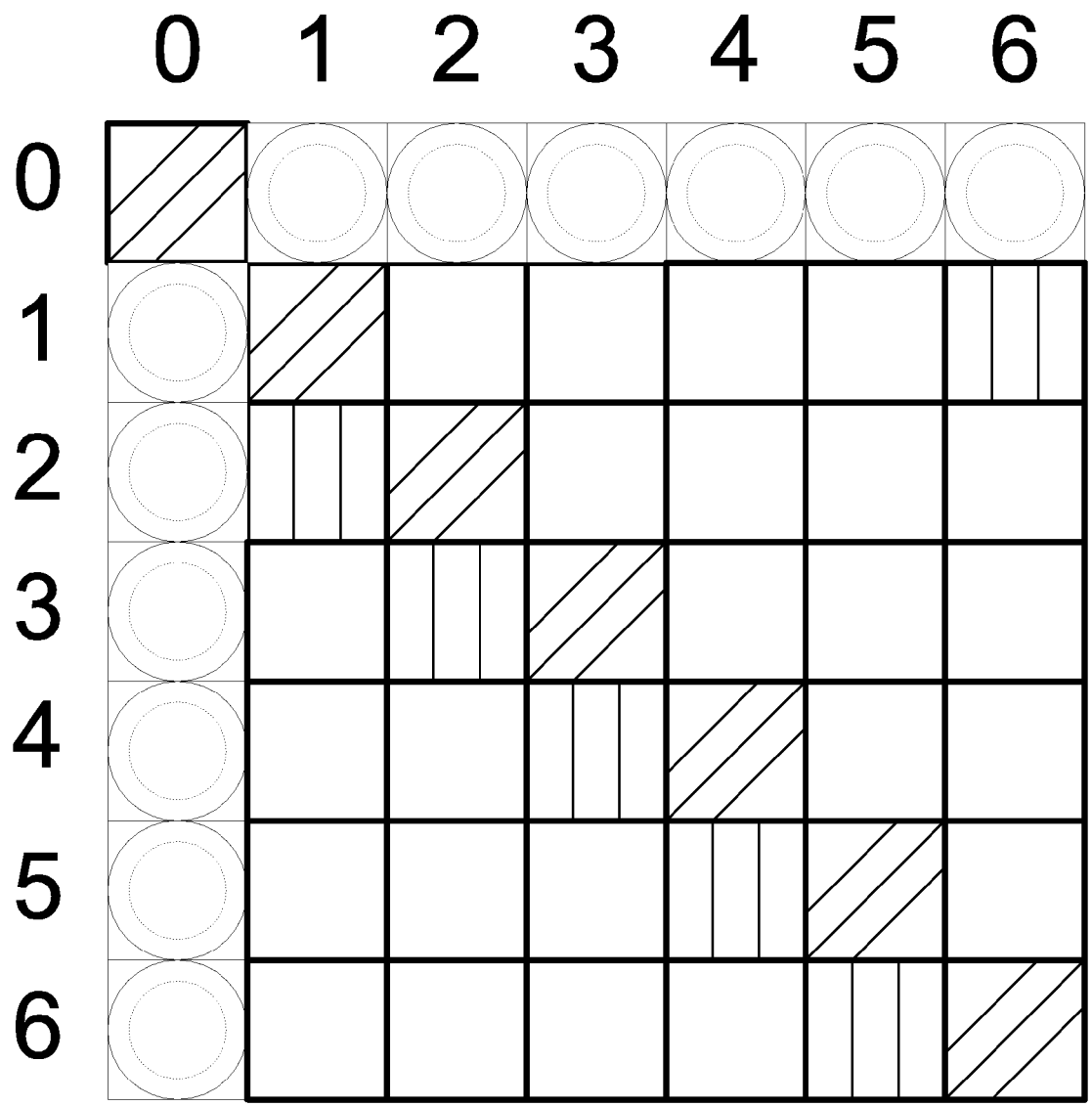
FIG. 9B illustrates transition matrix corresponding to the Hidden Markov Model illustrated in FIG. 9A according to one embodiment of the invention.

FIG. 9B illustrates a transition matrix corresponding to the Hidden Markov Model illustrated in FIG. 9A according to one embodiment. The matrix in FIG. 9B comprises 7×7 squares, each of which represents a transition between a pair of nodes (including "null" node) illustrated in FIG. 9A. There are four types of squares corresponding to the different types of transitions illustrated in FIG. 9A. A square with vertical lines represents transition between a pair of regular nodes, corresponding to a directed edge in solid line illustrated in FIG. 9A. For example, the square with vertical lines at column 1, row 2, corresponds to the edge between node 1([01]) and node 2([12]) in FIG. 9A. A square with diagonal lines represents no transition, corresponding to a "self edge" in dashed circle for each regular node illustrated in FIG. 9A. For example, the square with diagonal lines at column 1, row 1, corresponds to the "self" edge of node 1([01]) in FIG. 9A. A square with circles indicates depth continuity or image noise, corresponding to an edge in dotted line between a regular node and the "null" node illustrated in FIG. 9A. For example, the square with circles at column 1, row 0, corresponds to the edge between node 1([01]) and the "null" node 0([Φ]) in FIG. 9A. An empty square in FIG. 9B corresponds to the edge between a pair of regular nodes and such an edge needs not to be detected for decoding.

To provide fast, reliable and dense depth reconstruction, a depth reconstruction system exploits a novel concept of non-recurring De Bruijn sequences and generating optimized projection patterns based on them. For economical implementation of pattern projectors using lasers and diffractive optical elements, mirror symmetry is introduced to the non-recurring De Bruijn sequences. As a result, the depth reconstruction system overcomes many limitations in performance of cameras and projectors encountered by conventional depth reconstruction systems. The disclosed reconstruction system has a wide range application to real world problems, such as application in robotics and surveillance systems.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer implemented method for generating optimized projection patterns for depth reconstruction, the method comprising:

receiving a De Bruijn graph, the De Bruijn graph comprising a plurality of nodes and a set of alphabets and each node being labeled by a sub-set of the alphabets;

eliminating nodes with recurring alphabets from the De Bruijn graph to generate a modified De Bruijn graph;

calculating a cyclic sequence of the modified De Bruijn graph;

generating a non-recurring De Bruijn sequence based on the cyclic sequence; and generating optimized projection patterns from the non-recurring De Bruijn sequence.

2. The method of claim 1, wherein the cyclic sequence is a Hamiltonian cycle.

3. The method of claim 1, wherein the non-recurring De Bruijn sequence is a cyclic sequence of the alphabets without any recurring alphabets, in which all possible length-n subsequences of the alphabets, without any recurring alphabets, appear exactly once, and n is a positive integer number representing the length of a sub-sequence.

4. The method of claim 1, wherein generating the optimized projection pattern comprises encoding the non-recurring De Brujin sequence by a sequence coding method.

5. The method of claim 1, further comprises generating a length-2 non-recurring De Bruijn sequence from a non-recurring De Bruijn sequence whose length of a sub-sequence is greater than 2.

6. The method of claim 1, further comprises generating a symmetric non-recurring De Bruijn sequence whose length of a sub-sequence is 2 and the number of the alphabets being used is k, where k is a prime number and larger than 2.

7. The method of claim 1, further comprises decoding a projection pattern generated from a non-recurring De Bruijn sequence for an image onto which the pattern is projected.

8. The method of claim 4, wherein the sequence coding method encodes the non-recurring De Bruijn sequence and its associated alphabets in a temporal domain where multiple image frames are captured continuously.

9. The method of claim 4, wherein the sequence coding method encodes the non-recurring De Bruijn sequence and its associated alphabets in spatial domains of one captured image frame.

10. The method of claim 8, wherein encoding the non-recurring De Bruijn sequence and its associated alphabets comprises projecting each bit plane of the entire non-recurring De Bruijn sequence repeatedly over the multiple continuous image frames.

11. The method of claim 5, wherein generating the length-2 non-recurring De Bruijn sequence comprise removing one alphabet in very recurring alphabets pairs of the non-recurring De Bruijn sequence whose length of a sub-sequence is greater than 2.

12. The method of claim 6, further comprises encoding the symmetric non-recurring De Bruijn sequence using a pre-defined number of bit planes.

13. The method of claim 7, wherein decoding the projection pattern comprises determining a projected ray location for each pixel of the image.

14. The method of claim 13, wherein determining a projected ray location for a pixel comprises modeling the relationship probabilistically among a plurality of neighboring pixels of the pixel.

15. The method of claim 14, wherein modeling the relationships probabilistically comprises using a Hidden Markov Model for the non-recurring De Bruijn sequence that generates the projection pattern.

16. A computer system for generating optimized projection patterns for depth reconstruction, the system comprising:

a De Bruijn graph generation module, configured to generate a De Bruijn graph, the De Bruijn graph comprising a plurality of nodes and a set of alphabets and each node being labeled by a sub-set of the alphabets;

a non-recurring De Bruijn sequence generation module, communicatively coupled to the De Bruijn graph generation module, configure to:
 eliminate nodes with recurring alphabets from the De Bruijn graph to generate a modified De Bruijn graph;
 calculate a cyclic sequence of the modified De Bruijn graph; and
 generate a non-recurring De Bruijn sequence based on the cyclic sequence; and a projection pattern generation module, communicatively coupled to the non-recurring De Bruijn sequence generation module, configured to generate optimized projection patterns from the non-recurring De Bruijn sequence.

17. The system of claim 16, wherein the cyclic sequence is a Hamiltonian cycle.

18. The system of claim 16, wherein the non-recurring De Bruijn sequence is a cyclic sequence of the alphabets without any recurring alphabets, in which all possible length-n sub-sequences of the alphabets, without any recurring alphabets, appear exactly once, and n is a positive integer number representing the length of a sub-sequence.

19. The system of claim 16, wherein the projection pattern generation module is further configured to encode the non-recurring De Brujin sequence by a sequence coding module.

20. The system of claim 16, further comprises a length-2 non-recurring De Bruijn sequence generation module configured to generate a length-2 non-recurring De Bruijn sequence from a non-recurring De Bruijn sequence whose length of a sub-sequence is greater than 2.

21. The system of claim 16, further comprises a symmetric non-recurring De Bruijn sequence generation module configured to generate a symmetric non-recurring De Bruijn sequence whose length of a sub-sequence is 2 and the number of the alphabets being used is k, where k is a prime number and larger than 2.

22. The system of claim 16, further comprises a decoding module configured to decode a projection pattern generated from a non-recurring De Bruijn sequence for an image onto which the pattern is projected.

23. The system of claim 19, wherein the sequence coding module is configured to encode the non-recurring De Bruijn sequence and its associated alphabets in a temporal domain where multiple image frames are captured continuously.

24. The system of claim 23, wherein the sequence encoding module is further configured to project each bit plane of the entire non-recurring De Bruijn sequence repeatedly over the multiple continuous image frames.

25. The system of claim 19, wherein the sequence coding module is configured to encode the non-recurring De Bruijn sequence and its associated alphabets in spatial domains of one captured image frame.

26. The system of claim 20, wherein the length-2 non-recurring De Bruijn sequence generation module is further configured to remove one alphabet in very recurring alphabets pairs of the non-recurring De Bruijn sequence whose length of a sub-sequence is greater than 2.

27. The system of claim 21, further comprises a symmetric non-recurring De Bruijn sequence encoding module configured to encode the symmetric non-recurring De Bruijn sequence using a predefined number of bit planes.

28. The system of claim 22, wherein the decoding module is further configured to determine a projected ray location for each pixel of the image.

29. The system of claim 28, wherein the decoding module is further configured to model the relationship probabilistically among a plurality of neighboring pixels of the pixel.

30. The system of claim 29, the decoding module is further configured to use a Hidden Markov Model to model the relationship probabilistically for the non-recurring De Bruijn sequence that generates the projection pattern.

31. A non-transitory computer readable storage medium storing executable computer program instructions for generating optimized projection patterns for depth reconstruction, the computer program instructions comprising instructions for:
 receiving a De Bruijn graph, the De Bruijn graph comprising a plurality of nodes and a set of alphabets and each node being labeled by a sub-set of the alphabets;
 eliminating nodes with recurring alphabets from the De Bruijn graph to generate a modified De Bruijn graph;
 calculating a cyclic sequence of the modified De Bruijn graph;
 generating a non-recurring De Bruijn sequence based on the cyclic sequence; and
 generating optimized projection patterns from the non-recurring De Bruijn sequence.

32. The computer readable storage medium of claim 31, wherein the cyclic sequence is a Hamiltonian cycle.

33. A computer implemented method for image depth reconstruction using an optimized projection pattern, the method comprising
 receiving an non-recurring De Bruijn sequence;
 encoding the non-recurring De Bruijn sequence into optimized projection patterns;
 projecting the optimized projection patterns to a plurality of images; and
 reconstructing depth images from the plurality of images.

34. A computer implemented system for image depth reconstruction using an optimized projection pattern, the system comprising
 a non-recurring De Bruijn sequence generation module, configured to:
  receive an non-recurring De Bruijn sequence; and
  encode the non-recurring De Bruijn sequence into optimized projection patterns;
 a projector, communicatively coupled with the non-recurring De Bruijn sequence generation module, configured to project the optimized projection patterns to a plurality of images; and
 a depth reconstruction module, configured to reconstruct depth images from the plurality of images.

35. A non-transitory computer readable storage medium storing executable computer program instructions for image depth reconstruction using an optimized projection pattern, the computer program instructions comprising instructions for:
 receiving an non-recurring De Bruijn sequence;
 encoding the non-recurring De Bruijn sequence into optimized projection patterns;
 projecting the optimized projection patterns to a plurality of images; and
 reconstructing depth images from the plurality of images.

* * * * *

UNITED STATES PATENT AND TRADEMARK OFFICE
CERTIFICATE OF CORRECTION

PATENT NO. : 8,142,023 B2  
APPLICATION NO. : 12/337391  
DATED : March 27, 2012  
INVENTOR(S) : Jongwoo Lim Page 1 of 1

It is certified that error appears in the above-identified patent and that said Letters Patent is hereby corrected as shown below:

Column 12, line 42, delete "claim 8" and insert --claim 5--
Column 12, line 47, delete "claim 5" and insert --claim 8--

Signed and Sealed this
Eighth Day of May, 2012

David J. Kappos
*Director of the United States Patent and Trademark Office*